United States Patent [19]
Love

[11] Patent Number: 6,148,208
[45] Date of Patent: Nov. 14, 2000

[54] POWER CONTROL WITHIN A BROAD-BAND COMMUNICATION SYSTEM

[75] Inventor: Robert T. Love, Barrington, Ill.

[73] Assignee: Motorola, Inc., Schaumburg, Ill.

[21] Appl. No.: 09/217,158

[22] Filed: Dec. 21, 1998

[51] Int. Cl.[7] .................................................. H04Q 7/22
[52] U.S. Cl. ........................ 455/442; 455/522; 370/332
[58] Field of Search ................................. 455/522, 442, 455/444, 524, 525, 62, 63, 69; 370/332, 333

[56] References Cited

U.S. PATENT DOCUMENTS

| | | | |
|---|---|---|---|
| 5,095,531 | 3/1992 | Ito ............................................. | 455/442 |
| 5,574,983 | 11/1996 | Douzono et al. ........................ | 455/442 |
| 5,771,451 | 6/1998 | Takai et al. .............................. | 455/522 |
| 5,862,453 | 1/1999 | Love et al. ............................... | 455/522 |
| 5,960,347 | 9/1999 | Ozluturk ................................... | 455/442 |

*Primary Examiner*—Edward F. Urban
*Attorney, Agent, or Firm*—Kenneth A. Haas

[57] ABSTRACT

A high-speed data channel (105) is set to some minimum power level and changed to a second power level after at least one good frame has been received on a reverse link dedicated control channel (DCCH). The forward data channel power level (after a good reverse link frame is received on the DCCH) is increased over a plurality of frames to a power level that differs from the forward DCCH (103) power level, and is based on a difference in the number of handoff links between the DCCH (103) and the high-speed channel (105). Power control of the data channel (105) (after achieving the second power level) is then additionally based on a time between repeats sent due to negative acknowledgments of packet data frames sent on the data channel (105).

10 Claims, 5 Drawing Sheets

POWER CONTROL WITHIN A BROAD-BAND COMMUNICATION SYSTEM

FIELD OF THE INVENTION

The present invention relates generally to cellular communication systems and, in particular, to power control within a broad-band cellular communication system.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. To date, the transmissions have typically consisted of voice signals. More recently, however, it has been proposed to carry other forms of signals, including high-speed data signals. For ease of operation, it is preferable to have the data transmission capability overlay the existing voice communication capability, such that its operation is essentially transparent to the voice communication system while still utilizing the communication resources and other infrastructure of the voice communication system.

One such communication system currently being developed with transparent data transmission capabilities is the next generation Code-Division Multiple-Access (CDMA) cellular communication system, more commonly referred to as Wideband cdma, or cdma2000. Remote unit data transmission within a Wideband communication system takes place by assigning the remote unit a high-speed data channel (referred to as a supplemental channel (SCH)) and transmitting data utilizing the supplemental channel. More specifically, when data transmission is requested, a remote unit is immediately assigned a dedicated control channel (DCCH), and is power controlled to the correct transmit power utilizing only the DCCH. Once available, data transmission occurs utilizing the supplemental channel at a power level similar to that utilized for the DCCH. Likewise it is possible to have a separate voice channel called a fundamental channel (FCH) such that all three channels must be power controlled.

During soft handoff in next generation systems the DCCH, fundamental channel, and supplemental channel can have a differing number of base station links, different data rates, and different quality of services (QoSs). Because the feedback information (typically sent every 1.25 ms) used in power control of both the DCCH and supplemental channel is based on a metric comprising a number of soft-handoff links, QoS, and data rate for the DCCH, it is possible that the supplemental channel may operate at an unacceptable power level and QoS. More specifically, it is anticipated that (1) the number of DCCH soft-handoff links will always be greater than the number of supplemental channel soft-handoff links, (2) the supplemental channel data rate will always be higher than the DCCH or fundamental channel baud rate, and (3) the supplemental channel QoS will be substantially different with respect to the DCCH and fundamental channel. Because of this, a supplemental channel, operating at a similar power level as the DCCH, will not be power controlled in a manner to achieve the necessary QoS. Therefore, a need exists for power control within a broad-band communication system that adequately power controls a high-speed data channel.

DETAILED DESCRIPTION OF THE DRAWINGS

To address the need for power control of a high-speed data channel, a method and apparatus for power control is disclosed herein. In accordance with the invention, a high-speed data channel is set to some minimum power level and changed to a second power level after at least one good frame has been received on a reverse link dedicated control channel (DCCH). The forward data channel power level (after a good reverse link frame is received on the DCCH) is increased over a plurality of frames to a power level that differs from the forward DCCH power level, and is based on a difference in the number of handoff links between the DCCH and the high-speed channel. Power control of the data channel (after achieving the second power level) is then additionally based on a time between repeats sent due to negative acknowledgments of packet data frames sent on the data channel.

The present invention encompasses a method for power control within a communication system. The method comprises the steps of assigning a remote unit a first channel, and determining a power level and a number of soft-handoff links for the first channel. The remote unit is assigned a second channel and a number of soft-handoff links for the second channels is determined. The second channel is then power controlled based on a difference in the number of soft-handoff links between the first and the second channel.

The present invention additionally encompasses a method for power control of a data channel. The method comprises the steps of assigning a remote unit a first channel and determining a power level and a number of soft-handoff links for the first channel. The remote unit is assigned a high-speed data channel at a power level that is based on the power level for the first channel and the number of soft-handoff links for the first channel. Finally, the data channel is power controlled based on the number of soft-handoff links for the first channel and a frame quality of the data channel.

Figure 1:
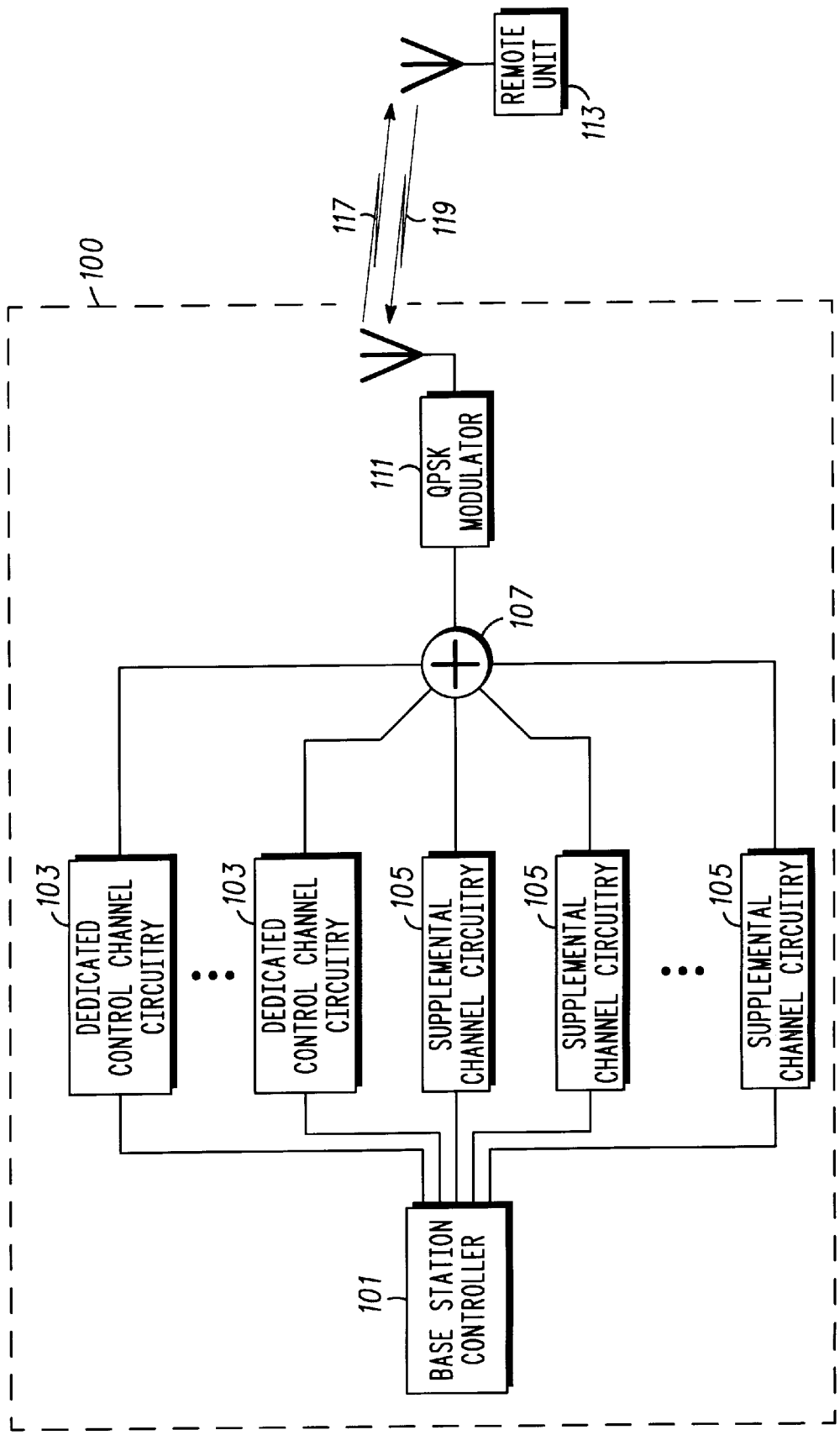
FIG. 1 is a block diagram of a base station for transmitting data in accordance with the preferred embodiment of the present invention.

Finally, the present invention encompasses an apparatus comprising first channel circuitry outputting data at a first power level and second channel circuitry outputting data at a second power level, wherein the second power level is based on a difference in the number of soft-handoff links between the first and the second channel. FIG. 1 is a block diagram of base station 100 for transmitting data to remote unit 113 in accordance with the preferred embodiment of the present invention. Base station 100 comprises base station controller 101, multiple DCCH circuits 103 (first channel circuits), one or more supplemental channel circuits 105 (second channel circuits), summer 107, and modulator 111. As shown, base station 100 is communicating to remote unit 113 via downlink communication signal 117, and remote unit 113 is communicating to base station 100 via uplink communication signal 119.

In the preferred embodiment of the present invention, communication to remote unit 113 may take place utilizing fundamental, supplemental, or DCCHs. In particular, base station 100 utilizes three classes of channels defined for both forward and reverse transmission. In the preferred embodiment, fundamental channels (not shown) are similar to existing CDMA traffic channels, and are used for voice and signaling, while the DCCHs are used for signaling and control information. CDMA DCCHs are described in detail in CDMA2000 ITU-R RTT Candidate Submission from TIA TR45.5 (CDMA2000), and Telecommunications Industry Association Interim Standards 95A-C (IS-95A-C), both of which are incorporated by reference herein. As described in CDMA2000 and IS-95C, the transmission rate of this channel may vary dynamically. Additionally, soft handoff (simultaneous communication utilizing more than one DCCH circuit 103) is supported utilizing DCCH circuitry 103. As discussed above, supplemental channels 105 are utilized for communicating high data rate services to remote unit 113. The data rate of the supplemental channels is negotiated prior to transmission. Multiple data sources are time multiplexed on this channel. In addition, the QoS (e.g., Frame Error Rate (FER), Bit Error Rate (BER) and/or Transmission Delay) of this channel may be set and operated independently of the DCCH.

Data transmission from base station 100 in accordance with the preferred embodiment of the present invention occurs as follows: During time periods where remote unit 113 is not actively communicating to base station 100 utilizing either a DCCH, fundamental, or a supplemental channel, remote unit 113 is actively or periodically monitoring a forward control channel (IS-95A or IS-95C paging channel) for notification of any pending transmission by base station 100. In particular, paging channel circuitry (not shown) is utilized to send messages to remote unit 113 indicating pending downlink transmissions. In the preferred embodiment of the present invention, paging channels circuitry is circuitry such as described in IS-95A Section 7.1.3.4, 7.6.2 and Section 7.7.2. Base station 100 determines that a high data rate transmission to remote unit 113 needs to take place and determines if supplemental channel circuitry 105 is available for utilization. Due to the limited number of supplemental channels available for communication, a supplemental channel may not be immediately available for transmission to remote unit 113. In the preferred embodiment of the present invention, if the supplemental channel is not immediately available, remote unit 113 is not assigned a DCCH until shortly prior to supplemental channel availability. Shortly prior to supplemental channel availability, base station 100 notifies remote unit 113 of a pending data transmission (via a paging channel) and assigns remote unit 113 a first channel (DCCH) to establish an appropriate transmit power level. In particular, base station 100 notifies remote unit 113 of spreading codes (Walsh Codes) utilized by the DCCHs and supplemental channels, and an assigned data rate of the supplemental channel.

Continuing, initial power of the DCCH is determined by having the initial forward-link gain set high enough to guarantee a successful call completion and an acceptable link. Since the channel quality between base station 100 and remote unit 113 is unknown at the time of origination, the DCCH is originated with a larger than normal forward-link power level and then powered down accordingly. At the same time a second channel (the supplemental channel) is set to some minimum power level and changed to a second level after at least one good frame has been received on the reverse link DCCH subsequently fast forward power control is enabled. In the preferred embodiment of the present invention the forward supplemental channel power level (after a good reverse link frame is received on the DCCH) is increased over two frames to a power level that differs from the forward DCCH power level, and is based on a DCCH power and a difference in the number of handoff links between the DCCH and the supplemental channel. In alternate embodiments of the present invention the forward supplemental channel power level is additionally based on a difference in the data rates between the DCCH and the supplemental channel, and a difference in the QoS between the DCCH and supplemental channel. Power control of the supplemental channel (after achieving the second power level described above) is then additionally based on frame quality information, which in the preferred embodiment is a time between repeats sent due to negative acknowledgments of packet data frames sent on the supplemental channel.

Because the feedback information used in power control of the supplemental channel is based on a difference in the number of soft-handoff links between the DCCH and the supplemental channel, the possibility that the supplemental channel may operate at an unacceptable power level and QoS is greatly reduced. More specifically, since the number of DCCH soft-handoff links will always be greater than or equal to the number of supplemental channel soft-handoff links, power controlling the supplemental channel based on a difference in the number of soft-handoff links increases the possibility that the supplemental channel will operate at an acceptable power level.

In an alternate embodiment of the present invention, instead of utilizing a time between repeats, an erasure indicator bit (EIB) or a quality indicator bit (QIB) (which is sent inside the reverse link supplemental channel payload or the reverse link DCCH payload as a single bit) is utilized instead. For example, for supplemental channel frame i received at the remote unit, a bit is included in the reverse supplemental channel frame i+2 sent from the remote unit to the base station to indicate whether frame i received at the remote unit was in error or not (EIB) or whether the quality was low or not (QIB). In the alternate embodiment of the present invention, these bits are utilized in place of a time between repeated frames.

Figure 2:
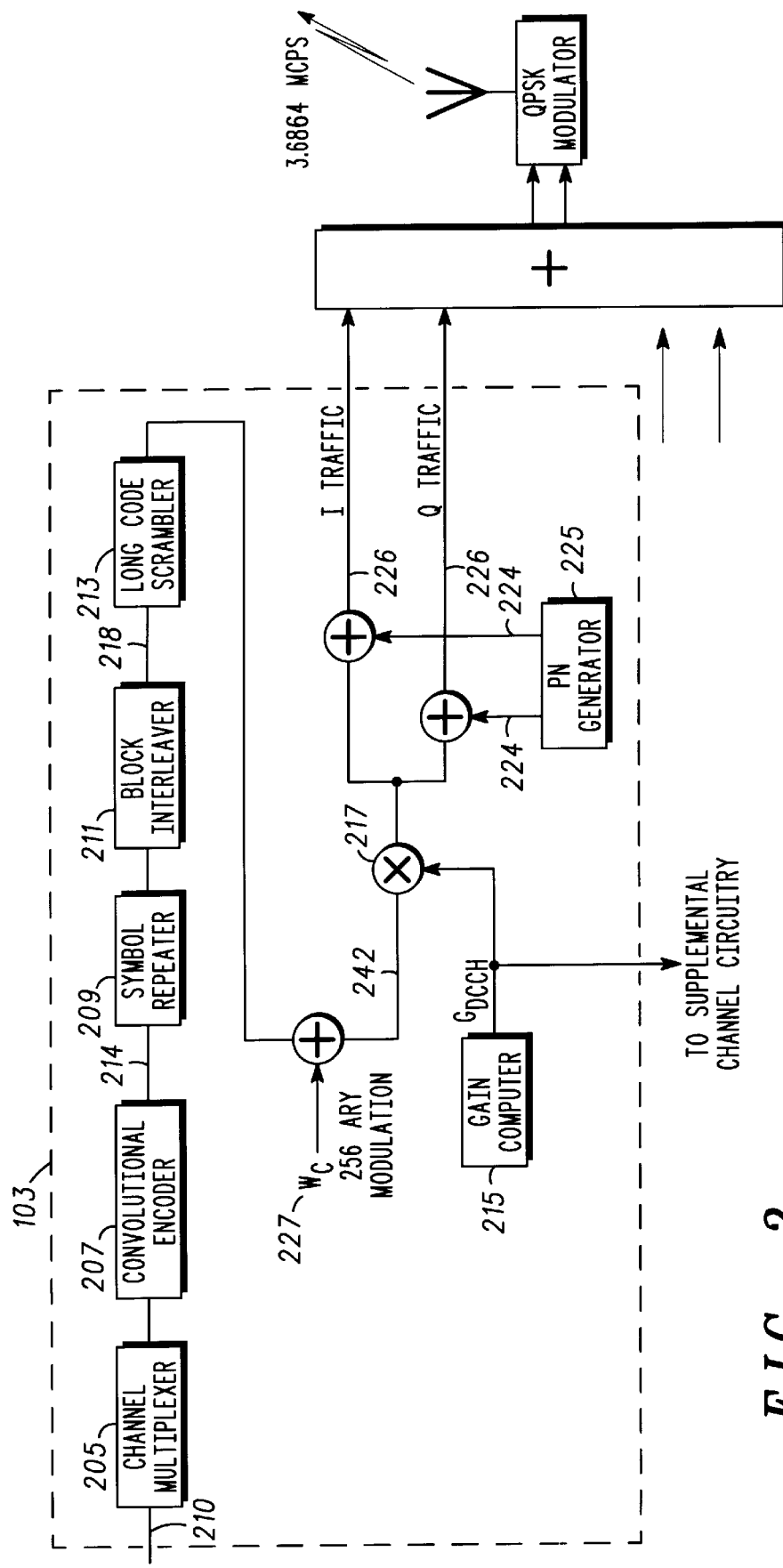
FIG. 2 is a block diagram of dedicated control channel circuitry of FIG. 1 for establishing a proper power level of a remote unit in accordance with the preferred embodiment of the present invention.

FIG. 2 is a block diagram of DCCH circuitry 103 of FIG. 1 for establishing a proper power level of a remote unit in accordance with the preferred embodiment of the present invention. DCCH circuitry 103 includes channel multiplexer 205, convolutional encoder 207, symbol repeater 209, block interleaver 211, long code scrambler 213, gain computer 215, orthogonal encoder 227, and Pseudo Noise generator 225. During operation, signal 210 is received by channel multiplexer 205 at a particular bit rate (e.g., 9.6 kbit/second). Input control channel data bits 210 typically include control and signaling information, pure data, or a combination of the two types of data. Channel multiplexer 205 multiplexes data, and/or control and signaling traffic onto the DCCH data 210 and outputs the multiplexed data at 9.6 kbit/sec to convolutional encoder 207. Convolutional encoder 207 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 207 encodes input data bits 210 (received at a rate of 9.6 kbit/second) at a fixed encoding rate of one data bit to two data symbols (i.e., rate ⅓) such that convolutional encoder 207 outputs data symbols 214 at a 28.8 ksymbol/second rate.

Data symbols 214 are then repeated by repeater 209 and input into interleaver 211. Interleaver 211 interleaves the input data symbols 214 at the symbol level. In interleaver 211, data symbols 214 are individually input into a matrix which defines a predetermined size block of data symbols 214. Data symbols 214 are input into locations within a matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 211 at the same data symbol rate that they were input (e.g., 28.8 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 28.8 ksymbol/second times 20 milliseconds which equals 576 data symbols which defines a 18 by 32 matrix.

Interleaved data symbols 218 are scrambled by scrambler 213 and output to orthogonal encoder 227. Orthogonal encoder 227 modulo 2 adds an orthogonal code having a first length (e.g., a 256-ary Walsh code) to each interleaved and scrambled data symbol 218. For example, in 256-ary orthogonal encoding, interleaved and scrambled data symbols 218 are each exclusive OR'd by a 256 symbol orthogonal code. These 256 orthogonal codes preferably correspond to Walsh codes from a 256 by 256 Hadamard matrix wherein a Walsh code is a single row or column of the matrix. Orthogonal encoder 227 repetitively outputs a Walsh code which corresponds to input data symbol 218 at a fixed symbol rate (e.g., 28.8 ksymbol/second).

Sequence of Walsh codes 242 are output to mixer 217 where they are gain controlled. In particular, mixer 217 mixes the sequence of Walsh codes 242 with a value ($G_{dcch}$) as described in IS-95A sections 6.1.2 and 6.6.3.1.1.1. The power adjusted sequence of Walsh codes are then further spread by a pair of short pseudorandom codes 224 (i.e. short when compared to the long code) to generate an I-channel and Q-channel code spread sequence 226. The I-channel and Q-channel code spread sequences 226 are used to bi-phase modulate a quadrature pair of sinusoids by driving the power level controls of the pair of sinusoids. The sinusoids output signals are summed, QPSK modulated (by modulator 115) and radiated by antenna to complete transmission of channel data bits 210. In the preferred embodiment of the present invention, spread sequences 226 are output at a rate of 3.6864 Mega Chips per second (Mcps) and radiated within a 5 MHz bandwidth, but in alternate embodiments of the present invention, spread sequences 226 may be output at a different rate and radiated within a different bandwidth. For example, in an alternate embodiment of the present invention an IS-95A (or IS-95B, or IS-95C) transmission scheme may be utilized where spread sequences 226 are output at a rate of 1.2288 Mcps (traffic channel chip rate) within a 1.25 MHz bandwidth.

Figure 3:
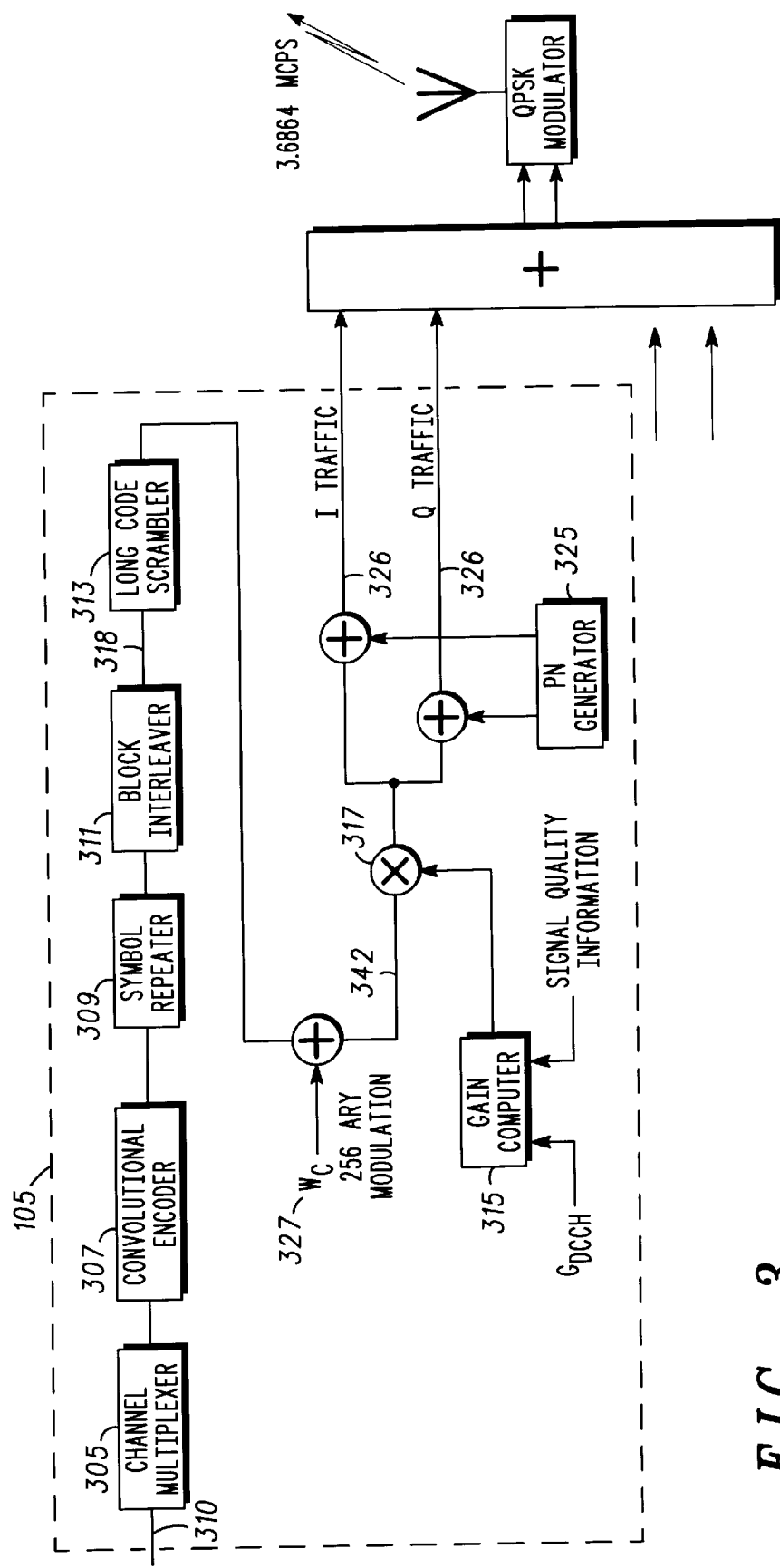
FIG. 3 is a block diagram of supplemental channel circuitry of FIG. 1 for transmitting data in accordance with the preferred embodiment of the present invention.

FIG. 3 is a block diagram of supplemental channel circuitry 105 of FIG. 1 for transmitting data in accordance with the preferred embodiment of the present invention. Supplemental channel circuitry 105 includes channel multiplexer 305, convolutional encoder 307, symbol repeater 309, block interleaver 311, long code scrambler 313, gain computer 315, orthogonal encoder 327, and Pseudo Noise generator 325. Operation of supplemental channel circuitry 105 occurs in a similar manner as fundamental channel circuitry 103 except for the operation of orthogonal encoder 327 and gain computer 315. In accordance with the invention, orthogonal encoder 327 modulo 2 adds an orthogonal code having a second length (e.g., a 16-ary Walsh code) to each interleaved and scrambled data symbol 318. For example, in 16-ary orthogonal encoding, interleaved and scrambled data symbols 318 are each exclusive OR'd by a 16 symbol orthogonal code. These 16 orthogonal codes preferably correspond to Walsh codes from a 16 by 16 Hadamard matrix wherein a Walsh code is a single row or column of the matrix. Orthogonal encoder 327 repetitively outputs a Walsh code which corresponds to input data symbol 318 at a fixed symbol rate (e.g., 460.8 ksymbol/second).

In the preferred embodiment, of the present invention the sequence of Walsh codes 342 are output to mixer 317 where they are gain controlled. In particular, mixer 317 mixes the sequence of Walsh codes 342 with a value ($G_{sup}$) where $G_{sup}$ is derived by gain computer 315. As described above, $G_{sup}$ is initially based on $G_{dcch}$ and a difference in the number of handoff links between the fundamental and supplemental channel. After origination $G_{sup}$ is additionally based on a time between repeats sent due to negative acknowledgments of packet data frames sent on the supplemental channel.

The power adjusted sequence of Walsh codes are then further spread by a pair of short pseudorandom codes 324 (i.e. short when compared to the long code) to generate an I-channel and Q-channel code spread sequence 326. The I-channel and Q-channel code spread sequences are used to bi-phase modulate a quadrature pair of sinusoids by driving the power level controls of the pair of sinusoids. The sinusoids output signals are summed, QPSK modulated (by modulator 115) and radiated by antenna to complete transmission of channel data bits 310. In the preferred embodiment of the present invention, spread sequences 326 are output at a rate of 3.6864 Mega Chips per second (Mcps) and radiated within a 5 MHz bandwidth, but in alternate embodiments of the present invention, spread sequences 326 may be output at a different rate and radiated within a different bandwidth. For example, in an alternate embodiment of the present invention an IS-95A (also IS-95B or IS-95C) transmission scheme may be utilized where spread sequences 326 are output at a rate of 1.2288 Mcps (traffic channel chip rate) within a 1.25 MHz bandwidth.

In the preferred embodiment of the present invention supplemental channel forward link gain upon channel origination, or upon a handoff state change (i.e., 3way to 2way soft handoff) is based on a gain of the DCCH for full rate frames and additionally based on a difference in the number of links between the dedicated control and supplemental channel and the difference in the targeted quality of service (QoS) between the dedicated control and supplemental channel. The difference between the supplemental channel rate and DCCH data rate is also taken into account. More particularly, the gain value derived by gain computer 315 upon channel origination or handoff state change is:

$$G_{sup} = G_{dcch} * G_{f\_init},$$

where $G_{dcch}$ is the gain value derived by gain computer 215 and is typically a value between 0 and 1024 digital gain voltage units. In accordance with the invention $G_{dcch}$ is updated every 1.25 milliseconds based on the value of a power control bit received on a reverse link such as a reverse link pilot channel (PICH) or punctured on the reverse DCCH. $G_{f\_init}$ is an initial or fixed gain ratio scale factor. In the preferred embodiment of the present invention $$G_{f\_init} = \begin{bmatrix} 1ab & & \\ 2ab & 1ab & \\ 3ab & 2ab & 1ab \end{bmatrix},$$

where row number denotes a number of DCCH forward links and column number denotes a number of supplemental channel forward links. Additionally a denotes an arbitrary scale factor based on a difference in the QoS between the DCCH and the supplemental channel and b denotes a scale factor based on the square root of the ratio of the supplemental channel data rate to the DCCH rate. For example, if a=1½, then the QoS of the supplemental channel is approximately equal to the QoS of the DCCH. Typical values of a would be 1, √0.79, √0.63, √0.50 for QoS differences between the DCCH and supplemental channel of less than 5%, between 5 and 10%, between 10 and 15%, and greater than 15% respectively.

After an initial value for $G_{sup}$ is determined, gain computer 315 calculates $G_{sup}$ based on a gain of the DCCH, a difference in the number of links between the DCCH and supplemental channel, and a frame quality of the supplemental channel. In other embodiment of the present invention, $G_{sup}$ is additionally based on a difference in the QoS between the DCCH and supplemental channel, a difference in the data rates between the DCCH and supplemental channel and a time between packet/frame repeats for the supplemental channel. In particular (every 1.25 ms), $$G_{sup} = G_{dcch} * G_{f\_init} * G_{tbr},$$

where, $G_{dcch}$ is the gain value derived by gain computer 215, and is typically a value between 0 and 1024 digital voltage gain units and is updated every 1.25 milliseconds based on the value of a power control bit received on a reverse link such as a reverse link pilot channel (PICH) or punctured on the reverse DCCH. Additionally, $G_{f\_init}$ is an initial or fixed gain ratio scale factor, and $G_{tbr}$ is a scale factor based upon a time between packet/frame repeats of the supplemental channel.

Figure 4:
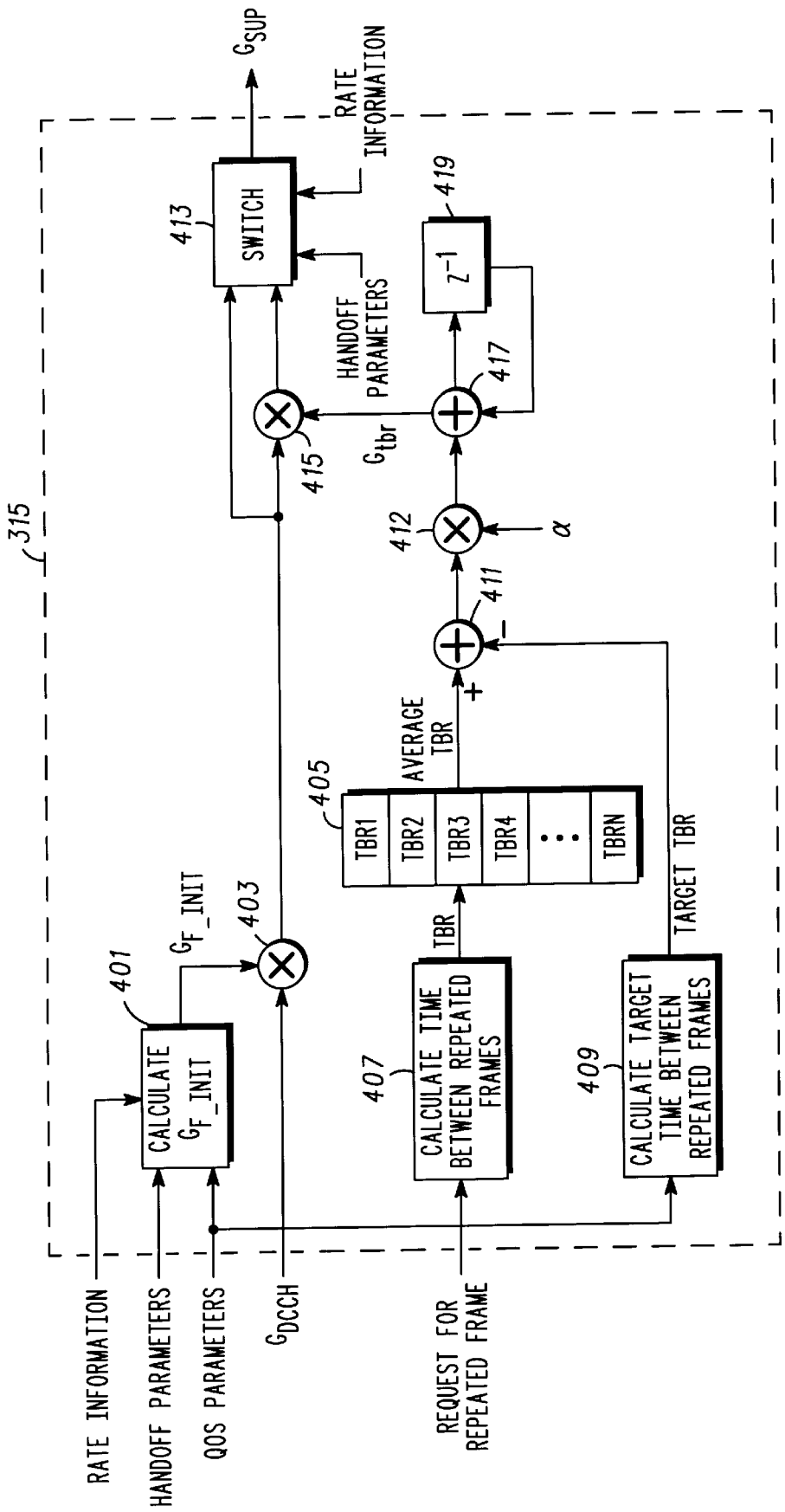
FIG. 4 is a block diagram of the gain computer of FIG. 3 in accordance with the preferred embodiment of the present invention.
Figure 5:
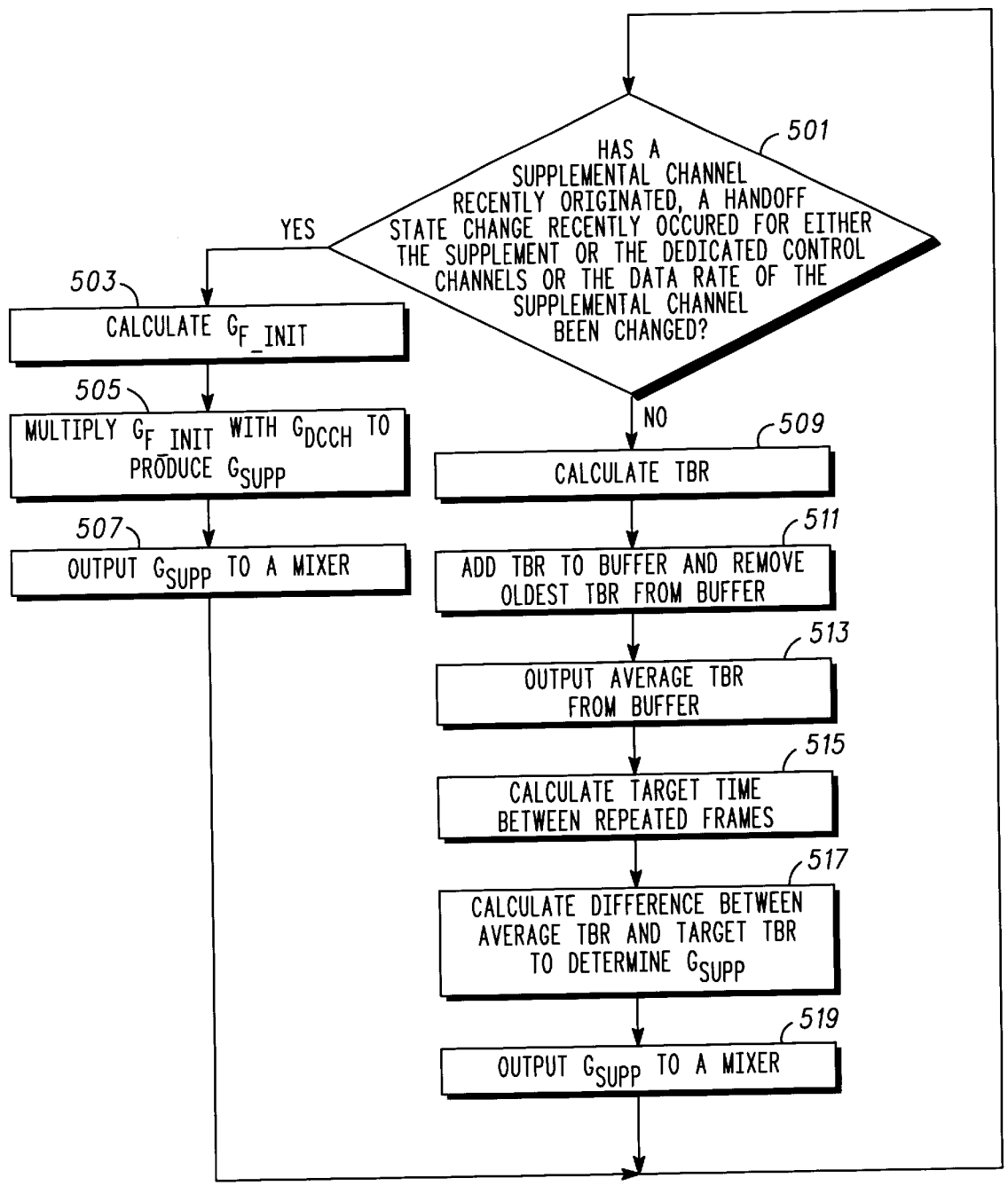
FIG. 5 is a flow chart showing operation of the gain computer of FIG. 4 in accordance with the preferred embodiment of the present invention.

FIG. 4 is a block diagram of gain computer 315 of FIG. 3 in accordance with the preferred embodiment of the present invention. Operation of gain computer 315 occurs as described in FIG. 5. in FIG. 5 it is assumed that a first channel (DCCH) has already been initiated between the remote unit and the base station, and that the power level for the DCCH, and the number of soft-handoff links for the DCCH is known. The logic flow begins at step 501 where switch 413 determines, based on handoff parameters, if a supplemental channel has recently originated, or a handoff state change has recently occurred for either the supplemental or the DCCHs or the data rate of the supplemental channel has been changed. Switch 413 accomplishes this decision by analyzing handoff parameters such as the number of forward links currently assigned to the DCCH and the supplemental channel, and analyzing rate information giving the current supplemental channel and DCCH data rate that are supplied to switch 413. If, at step 501, switch 413 determines that a supplemental channel has recently originated, or a handoff state change has recently occurred, or a supplemental channel's rate has been changed the logic flow continues to step 503 where $G_{f\_init}$ is calculated by calculator 401. As discussed above, calculator 401 determines $G_{f\_init}$ by determining a number of DCCH forward links and a number of supplemental channel forward links, the difference in the QoS of the DCCH and supplemental channel, and the ratio of the supplemental channel data rate to the DCCH data rate. At step 505 mixer 403 multiplies $G_{f\_init}$ with $G_{dcch}$ to produce $G_{sup}$ and at step 507 $G_{sup}$ is output to mixer 317. The logic flow then returns to step 501.

Returning to step 501, if at step 501 it is determined that a supplemental channel has not recently originated, or a handoff state change has not recently occurred, or the supplemental channel data rate has not recently changed, then the logic flow continues to step 509 where calculator 407 calculates a time between the last two repeated frames transmitted on the supplemental channel (TBR). At step 511 TBR is added to buffer 405 and the oldest TBR is removed from buffer 405. In the preferred embodiment of the present invention buffer 405 contains 5 TBR entries, and is emptied in a first-in, first-out manner. At step 513 an average TBR for all TBR values existing within buffer 405 is output, and at step 515 a target time between repeated frames is calculated by calculator 409. In the preferred embodiment of the present invention, a target time between repeated frames is based on a current QoS value such that TBR target=1/FER (QoS) where the FER(QoS) represents the expected supplemental frame erasure rate that corresponds to the desired QoS metric (bit error rate, frame error rate, etc). At step 517 a difference between the average TBR and target TBR is calculated by summer 411, scaled by a (a typical value for a is 0.01) using mixer 412 and then added to the previous difference 419 using summer 417 to determine $G_{tbr}$. At step 519 $G_{tbr}$ is mixed with the output of mixer 403 ($G_{f\_init} * G_{dcch}$) to produce $G_{sup}$ and at step 519 $G_{sup}$ is output to mixer 317. The logic flow returns to step 501.

In an alternate embodiment of the present invention $G_{tbr}$ is increased by a fixed amount (step_up) whenever a supplemental channel frame is repeated. Alternatively, $G_{tbr}$ is reduced by a second fixed amount (step_down) after a predetermined number (n) of supplemental channel frames have been transmitted without being repeated. A gain update technique of this kind is referred to as a saw-tooth approach because of the gain profile with respect to time. The relationship between the desired QoS and the chosen algorithm parameters (step_up, step_down, n) are given by the equation $$FERsup \approx \#errors \text{ (repeats) for step\_up}/(n * step\_up/step\_down),$$

where for example if #errors=1 and n=4, step_up=5h, step_down=1h then FERsup≈0.05 (=1/(4*5h/1h) ) where h is a scale factor chosen to reflect some percentage of $G_{tbr}$ (e.g. h=1.26/5). Setting the parameters controls when $G_{tbr}$ returns to the level at which it was increased from due to an erasure and hence allows a FER level to be targeted.

Yet another embodiment of the present invention utilizes a frame erasure indicator bit (EIB) or a quality indicator bit (QIB) in place of the supplemental frame repeat. The EIB or QIB would be sent on an uplink channel from the remote unit to the BTS's where this third channel typically being either a DCCH or supplemental channel. Therefore, instead of using time between repeats as a measurement of quality, the EIBs or QIBs would be utilized to indicate poor quality frames. For the sawtooth approach an EIB set to indicate an erased frame causes the $G_{tbr}$ to be increased by step_up. Similarly, a QIB set to indicate a poor quality frame cases $G_{tbr}$ to be increased by step_up. Subsequent EIB or QIB which indicate good frames (not erased or good quality) allow $G_{tbr}$ to be reduced by step-down every n good frames. For both the preferred and alternate embodiments of the present invention, typical values for n, step_up and step_down are 4, 1.26 and 1.26/5 respectively. During those times when the uplink DCCH or SCH is not available $G_{tbr}$ would not be updated using step_up and step_down. Updates would resume when a uplink channel is available.

The descriptions of the invention, the specific details, and the drawings mentioned above, are not meant to limit the scope of the present invention. For example, in addition to utilizing the above technique for downlink power control of a high-speed data channel the above techniques can be utilized to control uplink power control as well. It is the intent of the inventors that various modifications can be made to the present invention without varying from the spirit and scope of the invention, and it is intended that all such modifications come within the scope of the following claims and their equivalents.

What is claimed is:

1. A method for power control within a communication system, the method comprising the steps of:

assigning a remote unit a first channel;

determining a power level for the first channel;

determining a number of soft-handoff links for the first channel;

assigning the remote unit a second channel;

determining a number of soft-handoff links for the second channel; and power controlling the second channel based on a difference in the number of soft-handoff links between the first and the second channel.

2. The method of claim 1 wherein the step of power controlling the second channel further comprises the step of power controlling the second channel based on the power level for the first channel and the difference in the number of soft-handoff links between the first and the second channel.

3. The method of claim 1 wherein the step of power controlling the second channel further comprises the step of power controlling the second channel based on a difference in the Quality of Service (QoS) between the first and the second channels and the difference in the number of soft-handoff links between the first and the second channel.

4. The method of claim 1 wherein the step of power controlling the second channel further comprises the step of power controlling the second channel based on a frame quality of the second channel and the difference in the number of soft-handoff links between the first and the second channel.

5. A method for power control of a data channel, the method comprising the steps of:

assigning a remote unit a first channel;

determining a power level for the first channel;

determining a number of soft-handoff links for the first channel;

assigning the remote unit the high-speed data channel at a power level that is based on the power level for the first channel and the number of soft-handoff links for the first channel; and power controlling the data channel based on the number of soft-handoff links for the first channel and a frame quality of the data channel.

6. The method of claim 5 wherein the step of power controlling the data channel is additionally based on a difference in a Quality of Service (QoS) between the first and the data channel.

7. The method of claim 5 wherein the step of power controlling the data channel based on the number of soft-handoff links for the first channel and a frame quality of the data channel comprises the step of power controlling the data channel based on the difference in the number of soft-handoff links between the first and the second channel and the frame quality of the data channel.

8. The method of claim 7 wherein the step of power controlling the data channel based on the difference in the number of soft-handoff links between the first and the second channel and the frame quality of the data channel comprises the steps of power controlling the data channel based on the difference in the number of soft-handoff links between the first and the second channel and a time between repeats sent due to negative acknowledgments of packet data frames sent on the data channel.

9. The method of claim 7 wherein the step of power controlling the data channel based on the difference in the number of soft-handoff links between the first and the second channel and the frame quality of the data channel comprises the steps of power controlling the data channel based on the difference in the number of soft-handoff links between the first and the second channel and on erasure indicator bits sent on a third channel to indicate whether packet data frames sent on the data channel are erased or not erased.

10. The method of claim 7 wherein the step of power controlling the data channel based on the difference in the number of soft-handoff links between the first and the second channel and the frame quality of the data channel comprises the steps of power controlling the data channel based on the difference in the number of soft-handoff links between the first and the second channel and on quality indicator bits sent on a third channel to indicate whether packet data frames sent on the data channel are of good quality or poor quality.

* * * * *